C. S. HUMBERT.
BELT TIGHTENER AND LACER.
APPLICATION FILED MAR. 1, 1920.
1,389,760. Patented Sept. 6, 1921.
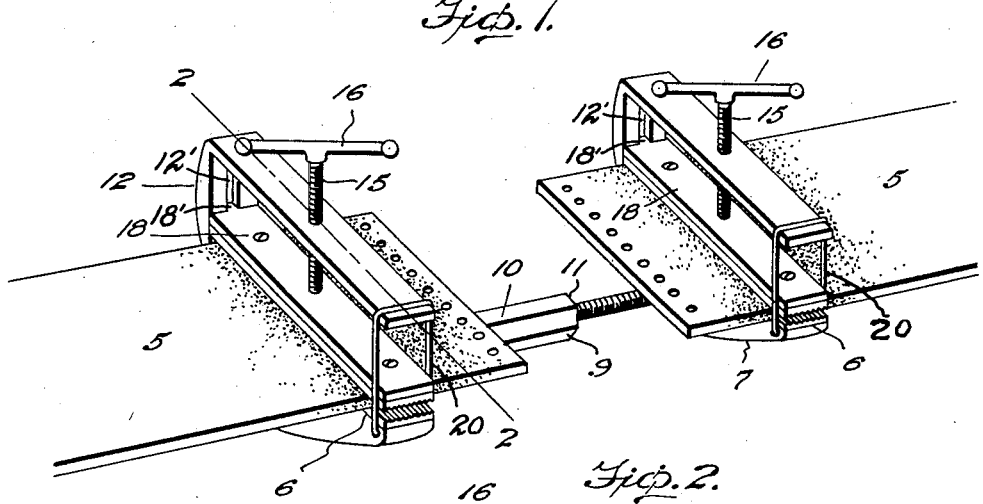
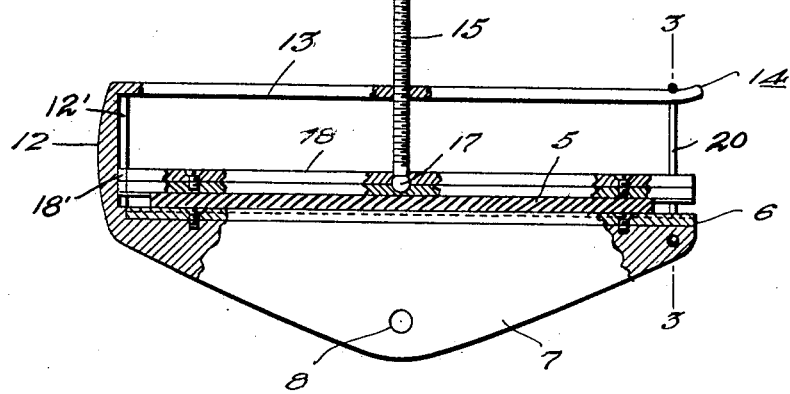
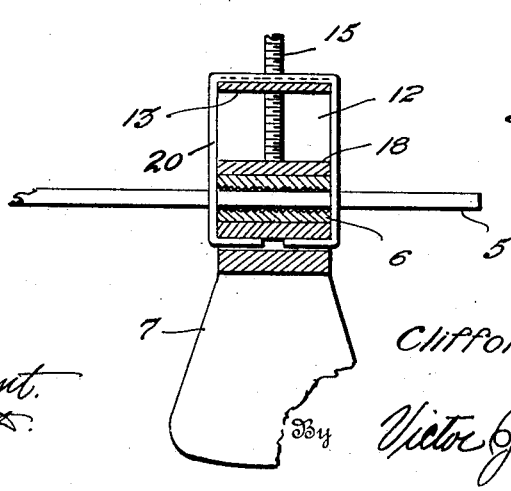
Witnesses
Paul M. Hunt
Inventor
Clifford S. Humbert.
By Victor J. Evans
Attorney

UNITED STATES PATENT OFFICE.

CLIFFORD S. HUMBERT, OF SCOBEY, MONTANA.

BELT TIGHTENER AND LACER.

1,389,760.   Specification of Letters Patent.   Patented Sept. 6, 1921.

Application filed March 1, 1920. Serial No. 362,290.

*To all whom it may concern:*

Be it known that I, CLIFFORD S. HUMBERT, a citizen of the United States, residing at Scobey, in the county of Sheridan and State of Montana, have invented new and useful Improvements in Belt Tighteners and Lacers, of which the following is a specification.

This invention has reference to a means for holding the ends of belts to permit of the lacing of said belt.

An object of the invention is to produce a simple device of this character which may be attached to the belt without necessitating the removal of the belt from its post.

A further object of the invention is to produce an article of this character which shall be of a very simple construction, cheap to manufacture, easily applied, and thoroughly efficient in operation.

The drawings illustrate a simple and satisfactory reduction of the improvement to practice.

In the drawings:

Figure 1 is a perspective view illustrating the application of the improvement.

Fig. 2 is a transverse sectional view, on an enlarged scale, approximately on the line 2—2 of Fig. 1.

Fig. 3 is an enlarged sectional view approximately on the line 3—3 of Fig. 2.

The ends of a belt 5 to be laced are engaged by clamping elements of the improvement. Each of the clamps include a body member 6 which is preferably in the nature of a flat plate having its upper face ribbed or roughened, and having its under face centrally provided with a longitudinal depending flange 7. Preferably the flange has its side walls inclined to its lower center, and the said flange at its said center is provided with a round opening 8 which is threaded. It is to be stated that the threads in the openings 8 of the opposed flanges have their threads pitched at opposite angles, and the said threads are engaged with the opposite pitched threads on the ends 9 of a turning member 10. The member 10 is preferably centrally formed with an angle portion 11 which provides a hand hold whereby said member may be turned and as a consequence adjust the body members 6 toward or away from each other.

Each of the body or jaw members 6 has one of its ends formed with an upwardly extending flange 12 that terminates in a horizontal flange 13 that overlies the body plate. The overlying member or flange 13 has its free end preferably rounded slightly upwardly as at 14 so as to provide a flared entrance between the overlying member and the body belt. As the jaw is constructed of metal the flange or finger 13 necessarily embodies an inherent resiliency, and the outer end 14 thereof is designed to spring away from the jaw proper.

Each of the overlying members 13 is approximately centrally provided with a threaded opening receiving therethrough the threaded shank 15 of a headed member 16. The inner end of the shank 15 is swiveled as at 17 to a clamp plate 18, which is disposed over the body 6 and beneath the overlying portion or flange 13. The under face of the clamp plate 18 is serrated so that when the same is brought to tight engagement with the ends of the belt 5 the said plate will be compressed between the serrations as well as between the serrations on the body plate. The plate or jaw 18 has its inner end provided with a central lug 18' which is received in a vertical groove 12' on the inner face or flange of the upstanding element 12 of the jaw 6. By this arrangement the plate or jaw 18 is guided vertically in the groove, the finger also serving as a fulcrum when the arm or flange 13 springs away from the jaw 6, thus releasing the pressure between the jaws 18 and 6 sufficiently to permit of the lateral withdrawal of the belt 5. To the outer end of the jaw 6, or to the flange 7 (which in reality provides a jaw for the plate 6 removably secured thereto) is provided with a swinging bail 20 designed to be swung over the upwardly rounded end of the flange or arm 13. This arrangement permits of the jaw 18 being adjusted toward the belt by the screw 15 after the belt ends have been received between the jaws, and an unscrewing of the said screw 15 to only a slight degree, if at all, will be necessary in releasing the belt from between the jaws when the bails are swung out of engagement with the arms or flanges 13.

Having thus described the invention, what I claim is:—

1. Two members including a fixed jaw on which a belt end is designed to rest, and means between the members for moving the same toward each other, the fixed jaw having an upstanding portion at one end thereof and a spring arm extending laterally therefrom and overlying the said fixed jaw, a bail carried by the fixed jaw and designed to swing over the spring arm for forcing the same toward the jaw, a screw threaded through the arm, and a movable jaw swiveled to the screw.

2. Two members each including a fixed jaw on which the ends of a belt to be laced rests, and means for moving the jaws toward each other, each of said jaws having an upstanding end which has its inner face grooved and the said end provided with an angularly extending spring arm which overlies the jaw, each of said arms having its end rounded upwardly, a bail pivotally connected to each of the jaws and designed to be swung over the spring arms for forcing the same in the direction of the jaws, a movable jaw having a lug received in the groove of the said upturned end of the fixed jaws, and a screw member threaded through the spring arms and having a swiveled connection with the movable jaws, as and for the purpose set forth.

In testimony whereof I affix my signature.

CLIFFORD S. HUMBERT.